(12) United States Patent
Young et al.

(10) Patent No.: US 12,636,575 B2
(45) Date of Patent: *May 26, 2026

(54) VIDEO GAME CONTROLLER WITH CUSTOMIZABLE RESPONSE

(71) Applicant: Voyetra Turtle Beach Inc., White Plains, NY (US)

(72) Inventors: Andrew Brian Young, Newport (GB); Daniel Adam Nuth, Newport (GB)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,305

(22) Filed: May 20, 2024

(65) Prior Publication Data

US 2024/0325879 A1 Oct. 3, 2024

Related U.S. Application Data

(63) Continuation of application No. 17/477,346, filed on Sep. 16, 2021, now Pat. No. 12,011,657.

(51) Int. Cl.
| | |
|---|---|
| *A63F 13/22* | (2014.01) |
| *A63F 13/235* | (2014.01) |
| *A63F 13/24* | (2014.01) |
| *A63F 13/26* | (2014.01) |
| *A63F 13/285* | (2014.01) |

(52) U.S. Cl.
CPC ............ *A63F 13/22* (2014.09); *A63F 13/235* (2014.09); *A63F 13/24* (2014.09); *A63F 13/26* (2014.09); *A63F 13/285* (2014.09)

(58) Field of Classification Search
CPC ........ A63F 13/22; A63F 13/235; A63F 13/26; A63F 13/285
See application file for complete search history.

(56) References Cited

U.S. PATENT DOCUMENTS

| | | | |
|---|---|---|---|
| 6,425,822 B1 | 7/2002 | Hayashida et al. | |
| 8,979,658 B1 * | 3/2015 | Kulavik .................. | A63F 13/22 |
| | | | 463/47 |
| 10,912,991 B2 | 2/2021 | Burh | |

(Continued)

FOREIGN PATENT DOCUMENTS

WO 2018020212 A1 2/2018

OTHER PUBLICATIONS

Sensitivity curves in Xbox Accessories app Windows 10. Answers. Microsoft.com. Online. Oct. 23, 2019. Accessed via the Internet. Accessed Dec. 2, 2024. <URL: https://answers.microsoft.com/en-us/xbox/forum/all/sensitivity-curves-in-xbox-accessories-app-windows/7938e19d-5a7e-4767-9e38-b35433dc9e79> (Year: 2019).*

(Continued)

*Primary Examiner* — Carl V Larsen

(74) *Attorney, Agent, or Firm* — McAndrews, Held & Malloy, Ltd.

(57) ABSTRACT

This disclosure describes a system that allows a user to generate and select, from a game controller, a response profile for an input of the game controller. The response profile may be displayed on a screen of the game controller. In addition to the game controller, the disclosed system may comprise an app, on a device external from the game controller, that is also able to generate and display the response profile.

20 Claims, 2 Drawing Sheets

(56)                References Cited

U.S. PATENT DOCUMENTS

| | | | | |
|---|---|---|---|---|
| 11,458,388 | B1 * | 10/2022 | Kestell | A63F 13/42 |
| 11,547,932 | B2 * | 1/2023 | Lea | A63F 13/31 |
| 12,011,657 | B2 * | 6/2024 | Young | A63F 13/235 |
| 2002/0198048 | A1 | 12/2002 | Wang | |
| 2003/0220142 | A1 | 11/2003 | Siegel | |
| 2004/0023719 | A1 * | 2/2004 | Hussaini | A63F 13/92 |
| | | | | 463/37 |
| 2006/0025217 | A1 * | 2/2006 | Hussaini | A63F 13/24 |
| | | | | 463/36 |
| 2010/0069154 | A1 | 3/2010 | Claussen | |
| 2010/0279769 | A1 * | 11/2010 | Kidakam | A63F 13/24 |
| | | | | 463/31 |
| 2011/0021269 | A1 * | 1/2011 | Wolff-Peterson | A63F 13/22 |
| | | | | 463/43 |
| 2014/0221087 | A1 * | 8/2014 | Huang | G09G 5/393 |
| | | | | 463/31 |
| 2014/0256427 | A1 * | 9/2014 | Wolff-Petersen | A63F 13/22 |
| | | | | 463/43 |
| 2014/0304335 | A1 | 10/2014 | Fung et al. | |
| 2015/0133218 | A1 * | 5/2015 | Yudintsev | A63F 13/355 |
| | | | | 463/31 |
| 2017/0282059 | A1 * | 10/2017 | Mahlmeister | A63F 13/22 |
| 2017/0368451 | A1 * | 12/2017 | Tiffany | A63F 13/22 |
| 2018/0104574 | A1 * | 4/2018 | Tager | A63F 13/20 |
| 2018/0267771 | A1 * | 9/2018 | Wiggemans | A63F 13/87 |
| 2019/0126140 | A1 * | 5/2019 | Nelson | A63F 13/20 |
| 2020/0016486 | A1 * | 1/2020 | Minamino | G06F 3/033 |
| 2021/0031099 | A1 * | 2/2021 | Black | A63F 13/22 |
| 2021/0342020 | A1 * | 11/2021 | Jorasch | G06F 3/011 |
| 2022/0040585 | A1 * | 2/2022 | Pichaimurthy | A63F 13/77 |
| 2022/0062756 | A1 * | 3/2022 | Lyden | A63F 13/218 |
| 2022/0401826 | A1 * | 12/2022 | Wang | A63F 13/23 |

OTHER PUBLICATIONS

Int'l Search Report and Written Opinion Appln No. PCT/US2022/043777 mailed Dec. 19, 2022.

* cited by examiner

VIDEO GAME CONTROLLER WITH CUSTOMIZABLE RESPONSE

The present application is a continuation of U.S. application Ser. No. 17/477,346, filed Sep. 16, 2021. The above-referenced application is hereby incorporated herein by reference in its entirety.

BACKGROUND

Limitations and disadvantages of conventional game controllers will become apparent to one of skill in the art, through comparison of such game controllers with some aspects of the present system set forth in the remainder of this disclosure with reference to the drawings.

BRIEF SUMMARY

A video game controller with customizable response is provided substantially as illustrated by and/or described in connection with at least one of the figures, as set forth more completely in the claims.

DETAILED DESCRIPTION

This disclosure describes a game controller system that allows a user to access and adapt the inputs of a game controller. The disclosed game controller system may comprise an application ("app"), on a device external from the game controller, that is operable to adjust settings of the game controller. These settings are viewable, by the user, from a screen on the game controller. The app may be a PC app, a windows app, or a Mac app. The app may also be a mobile app for a smartphone and/or tablet.

Certain embodiments of the disclosure may be found in a game controller with a user interface. In accordance with various embodiments of the disclosure, a device, such as a smartphone or tablet, may control one or more response profiles for the game controller inputs. These response profiles may be displayed on the user interface of the game controller. The external device may adapt and adjust the response profiles even while the game controller is being actively used during a game. The external device may communicate with the game controller wirelessly via Bluetooth, Wi-Fi, or any other wireless protocol. The game controller, disclosed herein, is not platform-specific and may communicate with a video game system wired or wirelessly via Bluetooth, Wi-Fi, or any other wireless protocol.

The disclosed game controller system offers an integrated response profile hub that delivers innovative applications of technology that improve a user's experience.

Figure 1:
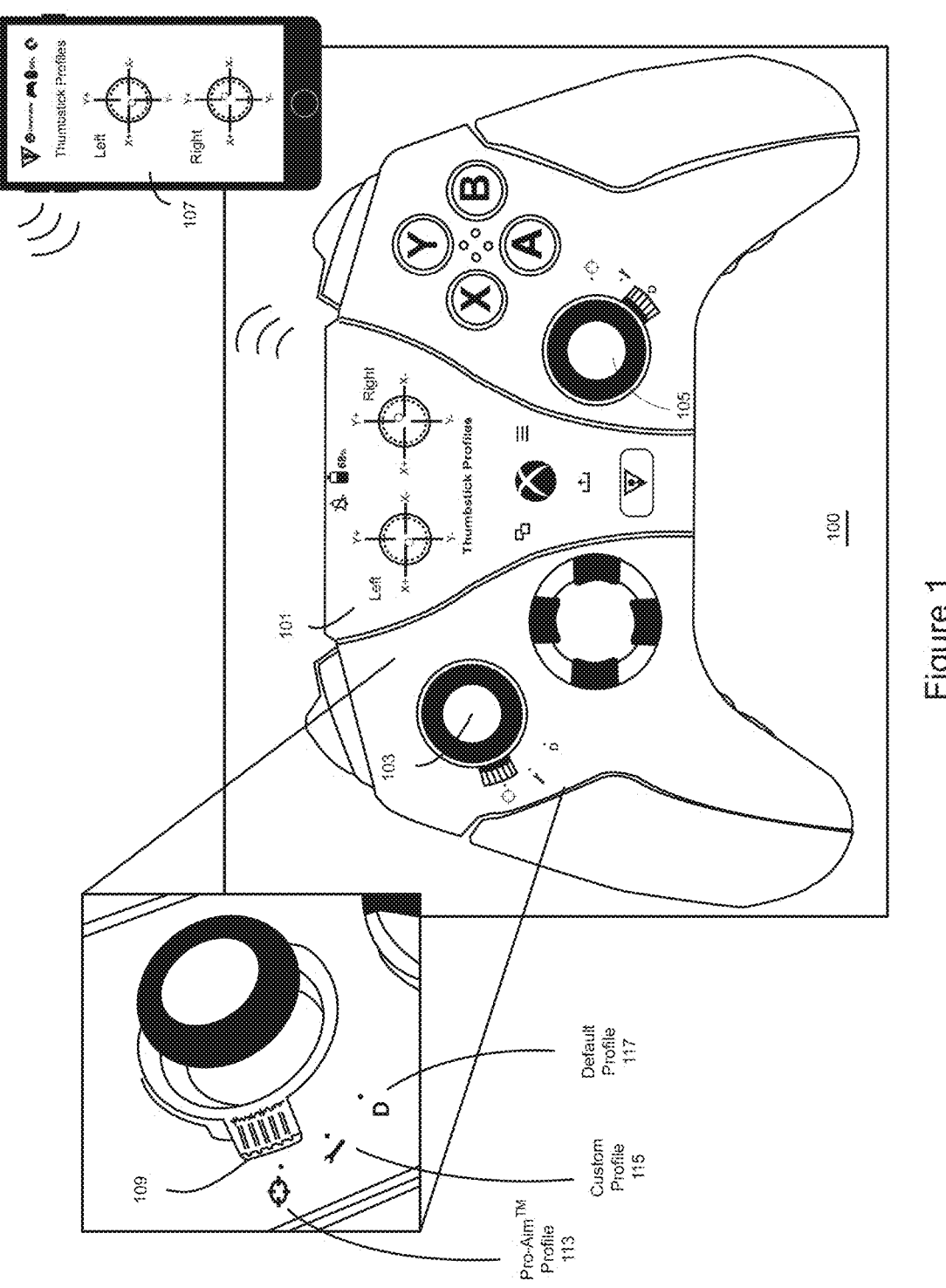
FIG. 1 illustrates an exemplary front view of a video game controller with a programmable thumb stick response profile in accordance with aspects of this disclosure.

FIG. 1 illustrates an exemplary front view 100 of a video game controller with a programmable thumb stick response profile. The game controller 100 is configured to operate a video game and also comprises a memory, a processor, a screen 101, and one or more thumb sticks 103 and 105. The video game may comprise a PC game, a console game, a mobile game a Mac game or any other electronic game. The memory in the game controller 100 is configured to store data associated with the game controller 100. The processor in the game controller 100 is configured to access the memory. The screen 101 is operably coupled to the processor and is configured to display the data to the user of the game controller 100. The game controller 100 may comprise a wireless interface that is operable to communicate directly with a video game console. A dongle may be plugged into the video game console to allow the wireless communication. For example, a USB connection on the video game console may be adapted, via the dongle, to communicate with the game controller 100 via Bluetooth, Wi-Fi or any other wireless protocol.

The screen 101 is integrated into the game controller 100. The screen 101 may comprise a graphical user interface and a touch screen. For example, the screen 101 may comprise a capacitive touch display. The screen 101 may also comprise a high resolution display with deep blacks and rich color. The screen 101 may be covered by a tempered glass that may be configured with smooth 3D curves on the edges.

The graphical user interface screen 101 in FIG. 1 illustrates a user-customizable dashboard that can be designed and redesigned by a user as desired for easy access to most frequently used features and to provide an overview of the controller 100 status.

The screen 101 may display programmable settings, loadouts, and/or metrics. What and how elements are displayed is adjustable, via the processor, even while the game controller 100 is in use. The display on the screen 101 may provide a quick, in-game access to the settings, loadouts, and/or metrics.

The game controller 100 may comprises one or more thumb sticks 103 and 105 that are programmable via the screen 101. The thumb sticks 103 and 105 comprises a physical switch 109 operable to select a response profile of the one or more response profiles 113, 115 and 117. As illustrated, the physical switch may select a Pro-Aim™ Profile 113, a Custom Profile 115 or Default Profile 117. While three selectable profiles are illustrated, this disclosure also covers configurations with more than three selectable profiles or less than three selectable profiles. The Pro-Aim™ Profile 113 is a focus mode that tunes the thumb stick sensitivity for enhanced long-range accuracy (e.g., for a sniper). As illustrated, the Custom Profile 115 may be programmed via the screen 101 by a user. Alternatively or additionally, the Custom Profile 115 may be programmed via an app 107 by a user or anyone else with access. The Custom Profile 115 may be used to adapt features (e.g., axis and curves) of a thumb stick response according to a user's preference.

The game controller 100 may comprise a rechargeable battery. The battery charge level on the screen 101 indicates when a battery needs to be swapped or recharged. Recharging may be performed via a cable or a dedicated cradle.

The processor in the game controller 100 may be operable to control communication from an external device 107.

Figure 2:
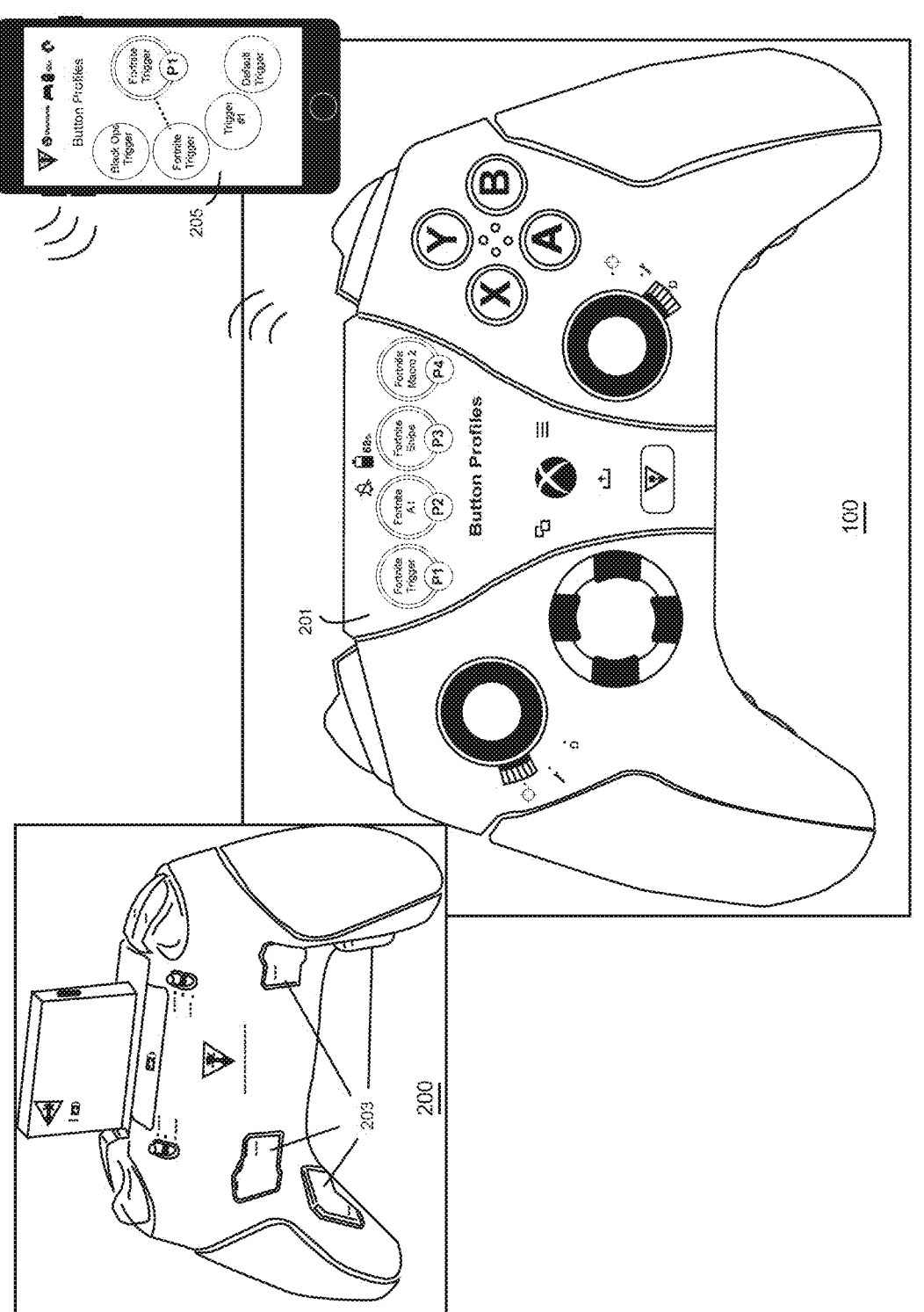
FIG. 2 illustrates an exemplary front view and rear view of a video game controller with a programmable button response profile in accordance with aspects of this disclosure.

FIG. 2 illustrates an exemplary front view 100 and rear view 200 of a video game controller with a programmable button response profile. One or more button response profiles may be selectable via the screen 201.

The screen 201 may allow a user to select the functionality of the programmable buttons P1, P2, P3 and P4 203. While four programmable buttons 203 are illustrated, this disclosure also covers configurations with more than four programmable buttons or less than four programmable buttons.

As illustrates the video game controller 100 is associated with an app 205 running on a mobile device. The app 205 may be used to configure and dynamically display and control the screen 201 on the game controller 100. The app 205 on the mobile device may be used to configure/create/ select a response profile. As illustrated, a page of the app 205 may be used to select a Fornite™ Trigger for button P1. Other choices for P1 may include a Black Ops™ Trigger, a Trigger #1 or a Default Trigger.

The app 205 may also be enabled to access storage of a cloud service provider and be powered by the cloud. The app 205 may provide full access to the game controller 100 to customize and improve performance.

Elements of the app 205 may also allow a user to customize a programmable button 203 to enable a macro (e.g., a sequence of inputs). The app may also display response profiles from a user's friends, which a user may adopt.

Adjustments to the game controller buttons, triggers and thumb sticks may be made in real time using the integrated screen 201. For example, trigger curves may be programmed.

An app running on the game controller 100 may monitor and analyze a user's performance and controller usage. According to this monitoring and analysis, the game controller 100 may personalize a response profile to help a user improve their gameplay. This automatic generation of profiles may be based on past usage. A user may be given an option to select the automatically-generated, personalized response profile. For example, Trigger #1 may be the automatically generated response profile.

The generation (manual and/or automatic), storage and communication of response profiles may be performed via an application that runs on the game controller 100, a computer, a mobile device, an edge computing device and/or a cloud computing device. The layout of the screen 201 may be designed, controlled and displayed via an application that runs on the game controller 100, a computer and/or a mobile device. The screen 201 may also comprise a communication setting indicator and a battery charge level indicator.

A non-transitory computer-readable medium storing a program may be operated by a processor on the external device via the app 107 (of FIG. 1) or 205 (of FIG. 2) and/or by a processor in the controller 100. The program may operably couple (e.g., via wireless communication such as Bluetooth, Wi-Fi and/or cellular protocols) the game controller 100 to a video game device and/or an external device (e.g., smartphone). Once operably coupled, the program may communicate response profiles via the processor, thereby allowing one or more response profiles to be displayed on a screen 101 (of FIG. 1) or 201 (of FIG. 2) of the game controller 100.

While the present system has been described with reference to certain implementations, it will be understood by those skilled in the art that various changes may be made and equivalents may be substituted without departing from the scope of the present system. In addition, many modifications may be made to adapt a particular situation or material to the teachings of the present disclosure without departing from its scope. Therefore, it is intended that the present method and/or system not be limited to the particular implementations disclosed, but that the present system will include all implementations falling within the scope of the appended claims.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a game controller, operable to control a video game console, comprising a thumb stick, a processor, and a display screen integrated into the game controller, and
   an application ("app"), operable on an external device, to display an illustration of the one or more features of the thumb stick, wherein:
       the game controller is configured to receive data representing the illustration of the one or more features of the thumb stick from the external device, and
       the game controller is configured to display, on the display screen, the same illustration of one or more features of the thumb stick.

2. The system of claim 1, wherein:

the game controller comprises a memory configured to store one or more response profiles for an input of the game controller.

3. The system of claim 1, wherein:

the game controller comprises a processor configured to access one or more response profiles.

4. The system of claim 1, wherein:

the game controller comprises a wireless interface operable to communicate with the video game console and the external device, wherein the external device is different than the video game console.

5. The system of claim 1, wherein:

the game controller is operable to display one or more response profiles to a user of the game controller.

6. The system of claim 1, wherein:

a graphical user interface, of the game controller, is configurable via the external device.

7. The system of claim 1, wherein:

a layout, of the game controller, comprises one or more response profiles that are selectable via a touch screen.

8. The system of claim 1, wherein:

a custom profile is configurable to adapt the one or more features of the thumb stick.

9. The system of claim 1, wherein:

the app is operable to generate one or more response profiles and route the one or more response profiles to the game controller.

10. The system of claim 1, wherein:

the app is a mobile app and the external device is one of a smartphone and a tablet.

11. The system of claim 1, wherein:

one or more response profiles are displayed while the game controller is in use.

12. The system of claim 1, wherein:

a processor, of the game controller, is operable to monitor a usage of the game controller, and the processor is operable to generate a response profile recommendation according to the usage of the game controller.

13. The system of claim 1, wherein:

the thumb stick comprises a physical switch operable to select between a stored response profile and a default control setting.

14. A method of operating a game controller, the method comprising:

controlling a video game console via a thumb stick of the game controller, wherein in addition to the thumb stick, the game controller comprises a processor, and a display screen integrated into the game controller, operating an application ("app") on an external device to display an illustration of one or more features of the thumb stick, receiving, at the game controller, data representing the illustration of the one or more features of the thumb stick from the external device, and displaying, on the display screen integrated into the game controller, the same illustration of the one or more features of the thumb stick.

15. The method of claim 14, wherein the method comprises:

storing one or more response profiles for the thumb stick.

16. The method of claim 14, wherein the method comprises:

selecting one or more response profiles via a touch screen of the game controller.

17. The method of claim 14, wherein the method comprises:

displaying one or more response profiles while the game controller is in use.

18. The method of claim 14, wherein the method comprises:

monitoring a usage of the game controller.

19. The method of claim 14, wherein the method comprises:

generating a response profile recommendation according to a usage of the game controller.

20. The method of claim 14, wherein the method comprises:

selecting between a stored response profile for the thumb stick and a default control setting for the thumb stick.

\* \* \* \* \*